Nov. 26, 1963 S. E. MILLER 3,112,460

ELECTROMAGNETIC WAVE DEVICES

Filed Dec. 29, 1960

2 Sheets-Sheet 1

INVENTOR
S. E. MILLER

BY Sylvan Sherman

ATTORNEY

Nov. 26, 1963 S. E. MILLER 3,112,460

ELECTROMAGNETIC WAVE DEVICES

Filed Dec. 29, 1960

2 Sheets-Sheet 2

INVENTOR
S. E. MILLER
BY *Sylvan Sherman*
ATTORNEY

United States Patent Office 3,112,460

Patented Nov. 26, 1963

3,112,460

ELECTROMAGNETIC WAVE DEVICES

Stewart E. Miller, Middletown, N.J., assignor to Bell Telephone Laboratories, Incorporated, New York, N.Y., a corporation of New York Filed Dec. 29, 1960, Ser. No. 79,239
17 Claims. (Cl. 333—9)

This invention relates to multichannel high frequency electromagnetic wave transmission systems and, in particular, to channel separating networks and channel combining networks for use in such systems.

One of the more important microwave circuits used in frequency division multiplex transmission systems is the channel separating network. It is the purpose of this network to segregate the individual signal channels in a common multichannel wave path for purposes of regeneration at repeater stations or for utilizing at terminal stations. Channel separating networks (alternatively referred to as channel dropping filters) are well known in the art and assume many and varied structural forms. A typical prior art channel separating arrangement, as shown in United States Patent 2,531,419, issued to A. G. Fox on November 28, 1950, comprises an input hybrid junction, an output hybrid junction and a pair of wave paths which interconnect two conjugately related arms of the input hybrid junction to two corresponding, conjugately related arms of the output hybrid junction. Suitably tuned and spaced filters are located within the interconnecting wave paths. In general, two hybrid junctions are required for each of the channels that is to be separated from the multichannel path. This is illustrated in FIG. 2 of the above-mentioned Fox patent wherein six hybrid junctions are required to separate three channels from the multichannel wave path.

A hybrid junction is basically a four branch power dividing device in which the branches are associated in pairs, each branch of a pair being conjugately related to the other branch of the same pair. The four branches generally meet at a common junction. In a broadband multichannel system, therefore, it is necessary for the hybrid junction to be both matched over a broad frequency range and also capable of equal power division over this range. However, even the best designed hybrid junction tends to be relatively narrowband in at least one of these categories. Furthermore, a well-designed hybrid junction is a relatively expensive microwave component.

Accordingly, it is an object of this invention to simplify channel separating networks.

It is a more specific object of this invention to produce channel separation without the use of hybrid junctions.

In accordance with the invention, simplification and improvement in channel separating networks have been accomplished by longitudinally dividing the multichannel wave path into two separate auxiliary wave paths each carrying half of the incident wave energy. A branch wave path to receive the dropped channel is simultaneously coupled to both of the auxiliary wave paths but because of the phase relationship of the wave energy in the two branches, substantially none of the incident wave energy is coupled to the branch wave path. At a point beyond the coupling interval, wave filters, suitably tuned and spaced, are inserted into each of the auxiliary arms to reflect back to the coupling interval a preselected channel in proper phase relationship for combining in the branch wave path. The remaining channels continue to propagate past the filters.

The unreflected channels may then be either recombined in a single wave path or additional channel separation can be effected merely by cascading additional branch wave paths and filters along the two auxiliary arms. This technique can be utilized to drop all the remaining channels without the necessity of ever recombining the two auxiliary arms.

In one illustrative embodiment of the invention particularly suited for the circular electric mode, a circular cylindrical waveguide is divided into two semicircular auxiliary waveguides by means of a longitudinally extending septum. A section of rectangular waveguide is coupled to each of the semicircular guides to receive the dropped channel. The frequency of the dropped channel is determined by tuned filters inserted in each of the semicircular guides. In its simplest form, a single coupling interval and a single filtering interval are utilized. The branch arms are then recombined to reform a circular waveguide for the continued propagation of the remaining channels.

In a second embodiment of the invention rectangular waveguides are used exclusively.

It is a feature of the invention that no hybrid junctions are used and that only a single simple power dividing component is required regardless of the number of channels that are separated. The extreme simplification in the geometry of the system results in substantial savings in money and permits the handling of a broader band of frequencies.

These and other objects and advantages, the nature of the present invention, and its various features, will appear more fully upon consideration of the various illustrative embodiments now to be described in detail in connection with the accompanying drawings, in which.

Figures 1, 2:
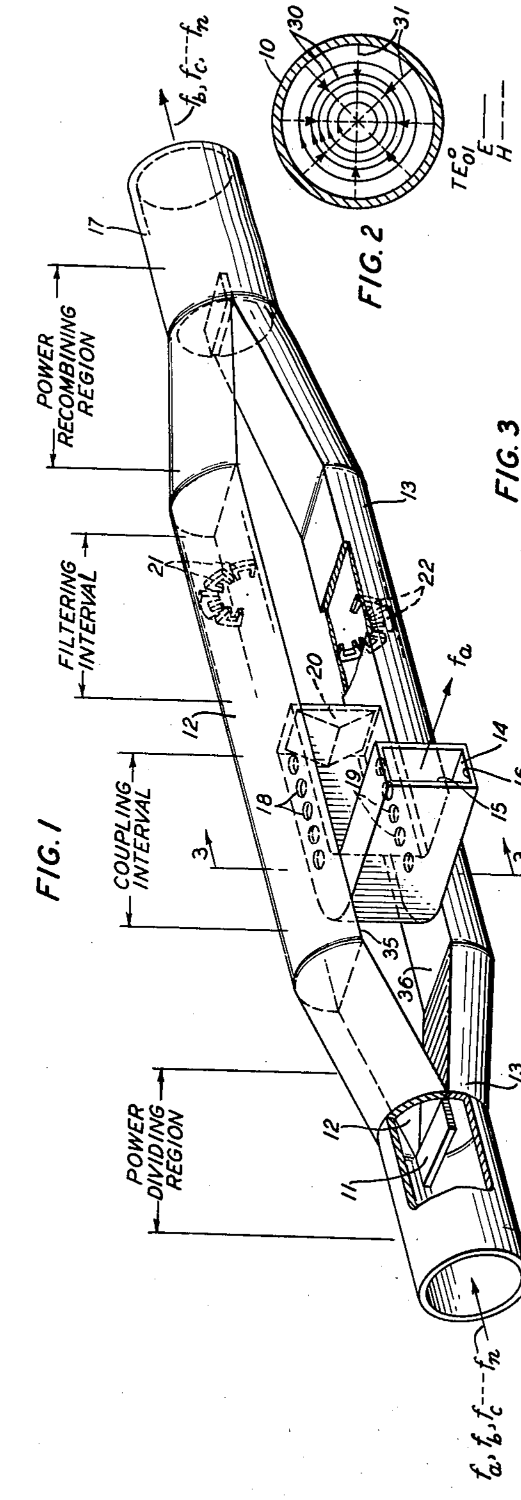
FIG. 1 is a perspective view of a simple channel separating network in accordance with the invention for separating a single channel from a multichannel wave path.
FIGS. 2, 3 and 4 illustrate, diagrammatically, the field configurations at various points within the network illustrated in FIG. 1.

Referring more specifically to FIG. 1, there is shown an illustrative embodiment of a channel separating network in accordance with the principles of the invention. The network comprises a power dividing region for dividing the incident wave energy in the principal waveguide 10 between two auxiliary waveguides or arms 12 and 13, a coupling interval for coupling the auxiliary guides 12 and 13 to a branch waveguide 14, a filtering interval for separating the channel to be dropped from the other channels, and a power recombining region for recombining in the output guide 17 the wave energy remaining in the auxiliary guides.

In the particular illustrative embodiment shown in FIG. 1, the principal wave path is a hollow, conductively bounded waveguide 10 having a circular, transverse cross section proportioned to support the circular electric $TE^{\circ}_{01}$ mode of wave propagation over the operating frequency range of interest. Power division is accomplished by bifurcating waveguide 10 by means of a thin longitudinally extending conductive septum 11 disposed along a diameter of the guide and extending in a transverse direction completely across it. Septum 11 thus divides guide 10 into two equal auxiliary guides 12 and 13, each having a semicircular cross section. Guides 12 and 13 extend parallel to each other for a very short distance and then diverge from each other a distance sufficient to accommodate therebetween the rectangular branch waveguide 14. Thereafter, guides 12 and 13 extend parallel to each other over a longitudinal distance sufficient to accommodate the requisite coupling and filtering intervals. In the embodiment shown in FIG. 1, there is only one coupling and one filtering interval. Thereafter the auxiliary guides 12 and 13 converge to reform a hollow circular cylindrical output waveguide 17.

Branch waveguide 14 may be a rectangular waveguide of the metallic shield type having a wide internal cross-sectional dimension 15 of at least one-half wavelength of the energy to be propagated therein, i.e., the dropped channel, and a narrow internal dimension 16 substantially one-half the wide dimension. So proportioned, the branch guide is supportive of the dominant mode of wave propagation known in the art as the $TE^{\square}_{10}$ mode. Guide 14, entering between guides 12 and 13 at an angle, is bent until its longitudinal axis is aligned parallel to the longitudinal axes of guides 12 and 13. Thereafter, guide 14 extends parallel to and symmetrically between guides 12 and 13 wtih its narrow walls contiguous to the opposed planar wall surfaces 35 and 36 of guides 12 and 13 respectively.

Waveguide 14 is electromagnetically coupled to the auxiliary guides over a coupling interval of several wavelengths by one of the several broadband directonal coupling means familiar to the directional coupler art. This coupling may be, as illustrated, a plurality of apertures 18 and 19 extending through the center of the adjacent walls of guides 14 and 12 and guides 14 and 13, respectively, and longitudinally distributed therealong at intervals of less than one-half wavelength.

The right hand end of guide 14 is terminated in a reflectionless manner by the characteristic impedance of the guide. By way of example, guide 14 is terminated by a tapered or wedge-shaped termination 20 made of an electrically lossy material such as polyfoam impregnated with carbon black.

To the right of the coupling interval, defined by coupling apertures 18 and 19, is a filtering interval wherein there is located frequency selective means for reflecting wave energy at the frequency of the channel that is to be separated.

In the operation of the channel-dropping network of FIG. 1, a plurality of input signals or channels having center frequencies $f_a, f_b, f_c \ldots f_n$ and propagating in the $TE^{\circ}_{01}$ mode are applied to guide 10. It is the function of the network to separate at least one of these channels such as, for example, the band of frequencies centered about $f_a$, from the rest of the channels.

The applied wave energy, upon reaching septum 11, divides equally between the two auxiliary arms 12 and 13. FIG. 2 illustrates the distribution of the electric and magnetic field vectors in a transverse section of waveguide 10. As shown therein, the electric field vectors, designated by the solid lines 30, consist of circular lines, coaxial with the guide and lying transversely thereto since there are no longitudinal components of electric field associated with the $TE^{\circ}_{01}$ mode. The magnetic field vectors, however, have both transverse components, indicated by dotted lines 31, and longitudinal components (not shown). Specifically, the magnetic field vectors form closed loops which lie in radial planes which are everywhere normal to the direction of the electric field vectors 30. In any given transverse plane, the longitudinal magnetic field components adjacent to the inside surface of the guide wall are in-phase and directed in one direction, while the longitudinal components along the guide axis are in-phase and directed in the reverse direction.

Figures 3, 4, 10:
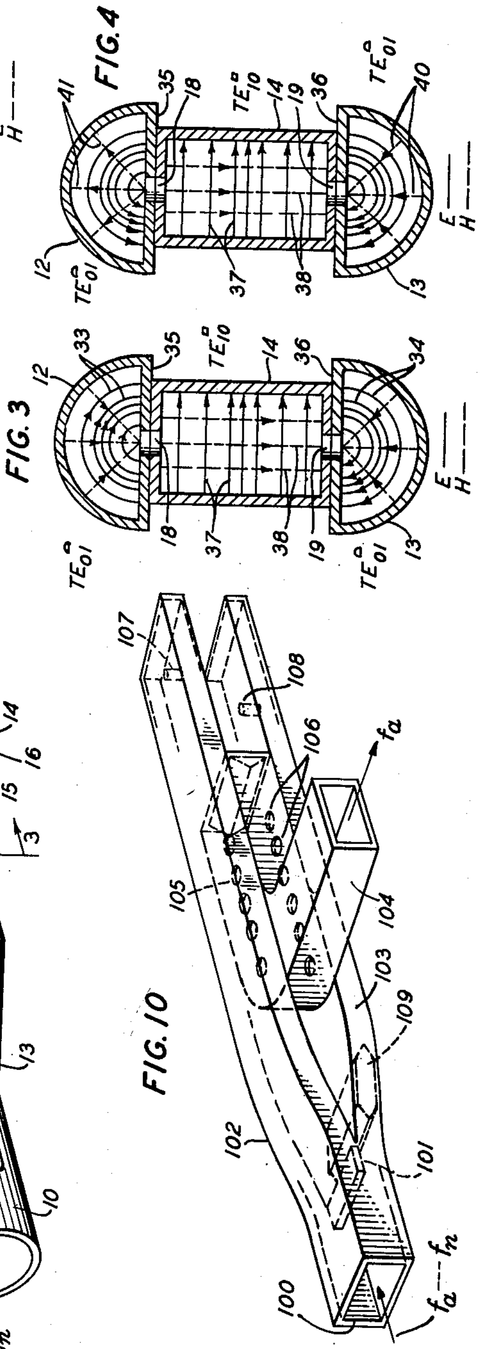
FIG. 10 illustrates a second embodiment of the invention using rectangular waveguides.

FIG. 3 which is a section taken along 3—3 of FIG. 1, shows the field configuration in the two auxiliary guides 12 and 13 and in the branch waveguide 14. As can be seen, the field configuration in each auxiliary guide is basically one-half of the field configuration in guide 10. That is, the electric field vectors in each auxiliary guide are made up of semicircular lines 33 and 34 which terminate on the planar surfaces 35 and 36, respectively. At any instant, the electric field associated with the incident wave is directed either clockwise or counterclockwise in both guides. The magnetic field vectors, indicated by the dotted lines, as noted previously form loops which lie in radial planes. The field configuration in guides 12 and 13 have been designated the $TE^{\ominus}_{01}$ mode, where the semicircular superscript refers to the semicircular cross section of the auxiliary waveguide.

The field configuration in waveguide 14 is that of the dominant $TE^{\square}_{10}$ mode in which the electric field vectors 37 extend across the guide in a direction parallel to the narrow guide walls and wherein the magnetic field vectors 38 form loops whose planes extend in a direction parallel to the wide guide walls. At any instant, therefore, the direction of the magnetic field along the upper narrow wall of the rectangular guide is opposite to the direction of the magnetic field along the lower narrow wall of the rectangular guide. This is in contrast to the direction of the magnetic field components associated with the auxiliary guides wherein the magnetic field components adjacent to the planar walls 35 and 36 in both guides 12 and 13 extend in the same direction. Because of this difference, the wave energy coupled into the branch guide from the two auxiliary guides as the incident waves propagate past the coupling apertures 18 and 19 is equal in amplitude but opposite in phase so that the overall effect is to prevent any net transfer of power from the auxiliary guides to branch guide 14.

After propagating past the coupling interval, the incident wave energy enters upon the filtering interval. As is well known, there are various configurations of conductive discontinuities which, when placed inside a waveguide fairly well approximate an inductance or a capacitance. By proportioning the conductors so that at some prescribed frequency the magnitude of their respective components of inductive and capacitive impedance are equal, the discontinuity exhibits the properties of resonance. Depending upon the size and shape of the discontinuity, the resonance thus produced may be either of the parallel type, offering a high impedance across the guide to wave energy at the resonant frequency, or of the series type, offering a low impedance across the waveguide at the resonant frequency. If so proportioned to produce series resonance, the discontinuity appears as a short circuit to wave energy at the resonant frequency and such energy is reflected. In FIG. 1 the rejection of wave energy at a particular frequency is obtained by using a series resonant type discontinuity or iris comprising a plurality of C-shaped elements 21 and 22 distributed about the inner periphery of guides 12 and 13, respectively. The elements are conductively connected to the inner surface of the respective waveguides but circumferentially spaced from each other by a small distance. The two sets of elements 21 and 22 are longitudinally displaced from each other by a distance such that the relative phase angle of the energy reflected from the filters undergoes a 180 degree phase shift and, thus, reappears at the coupling intervals 18 and 19 with the proper phase for coupling to the branch guide 14. Assuming that the propagation constants for the two auxiliary guides are the same, filter 21 is longitudinally displaced from filter 22 by a distance equal to one-quarter wavelength at the frequency of the channel to be separated.

In a channel-dropping network using series resonant discontinuities in the filtering interval, the channel to be separated, $f_a$, is reflected back towards the coupling interval and reappears at the coupling apertures 18 and 19 with the field components in the auxiliary guides in-phase with respect to the field components in branch guide 14. This is indicated in FIG. 4. It will be noted that the magnetic field components 41 associated with the reflected wave in guide 12 have experienced a 180 degree phase reversal with respect to the magnetic field components 40 associated with the reflected wave in guide 13. This has the effect of putting the magnetic fields in the auxiliary guides in-phase with respect to the magnetic field components in guide 14 in the region of the coupling apertures so that now substantially all of the wave energy associated with channel $f_a$ is coupled from the auxiliary guides 12 and 13 to branch guide 14.

The remaining channels, $f_b, f_c \ldots f_n$, being substantially unaffected by the filters, continue to propagate along guides 12 and 13 and recombine in output guide 17.

In the relatively simple structure of FIG. 1, the filters 21 and 22 are shown as single units. However, as is well known, the reflective properties of the filter can be enhanced by using a plurality of such filters arranged in cascade, spaced a half wavelength apart at the frequency of the channel to be dropped. It is also understood that other band rejection filtering means may be used such as are described in my copending application Serial No. 816,147, filed May 27, 1959, now United States Patent 2,991,431, issued on July 4, 1961, or in the United States Patent No. 2,950,452, issued to E. A. J. Marcatili on August 23, 1960.

Figures 5, 6, 7, 8, 9:
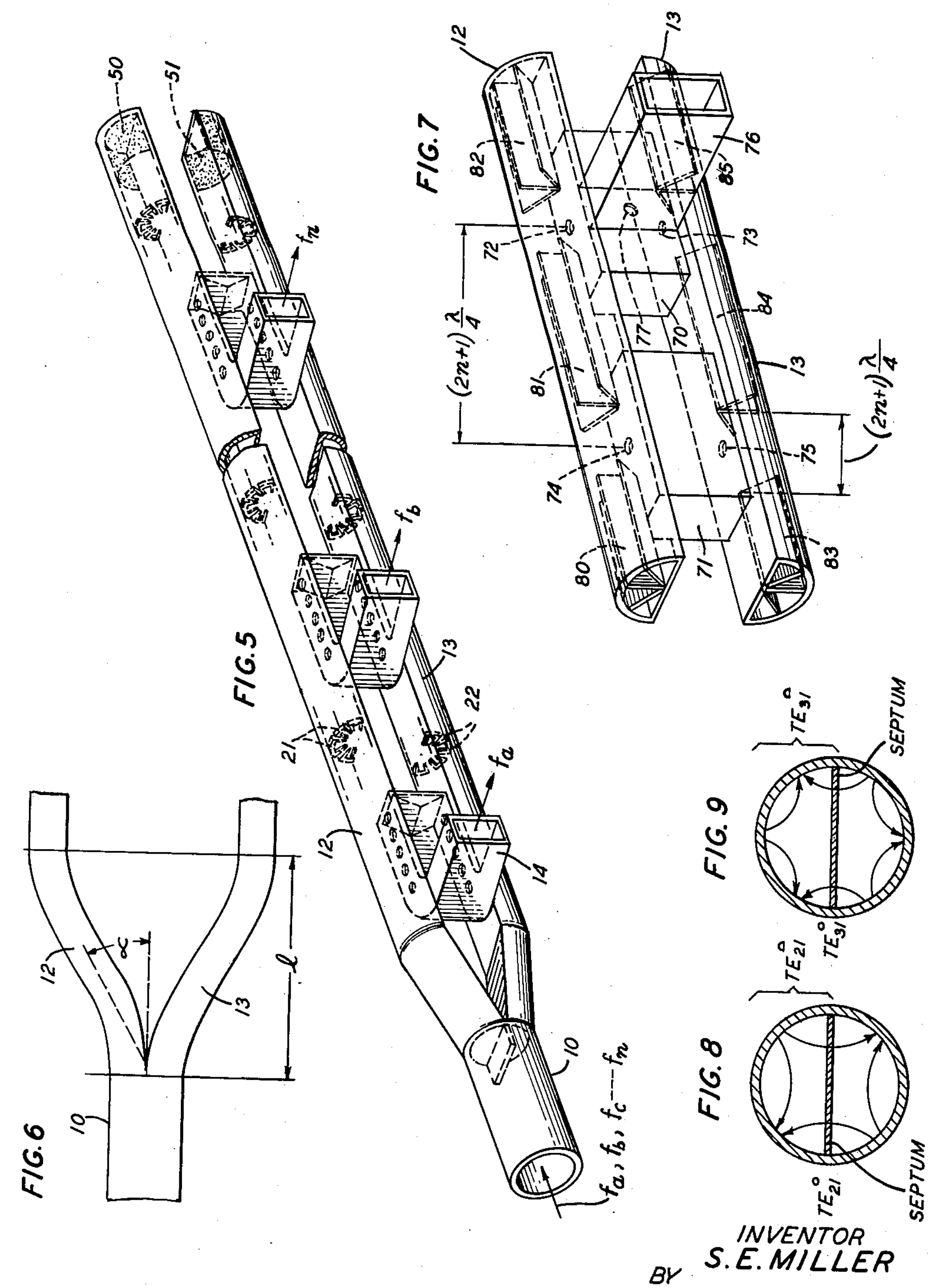
FIG. 5 is a perspective view of a channel separating network, in accordance with the invention, for segregating a plurality of channels from a multichannel wave path.
FIG. 6 shows diagrammatically the manner in which the power dividing region is tapered.
FIG. 7 shows an alternative coupling arrangement for coupling the branch waveguide to the auxiliary waveguides.
FIGS. 8 and 9 illustrate, diagrammatically, the field configuration of various spurious modes which may be excited in the auxiliary waveguides.

For purposes of explanation, only one channel has been shown dropped in the embodiment illustrated in FIG. 1. However, each of the remaining channels may be separated if, instead of recombining the channels $f_b, f_c \ldots f_n$, as shown, additional coupling intervals and filtering intervals are inserted following filters 21 and 22. This is illustrated in FIG. 5 where branch arms 12 and 13 are extended to accommodate $n$ cascaded coupling intervals and associated branch guides and filters where each successive pair of filters is tuned and spaced for the particular channel to be dropped. The specific order in which the channels are dropped, however, may be varied in accordance with any predetermined arrangement.

Since substantially all of the wave energy is extracted from the auxiliary guides 12 and 13, they are terminated at their ends by means of resistive linings 50 and 51 placed along their inner wall surfaces rather than recombined as was done in the embodiment of FIG. 1.

It will be noted that complete channel separation can be achieved, in accordance with the invention, utilizing only one simple power dividing component. This is in contrast to the prior art channel-dropping networks, as disclosed in the above-cited patent to A. G. Fox, which requires two hybrid junctions for each dropped channel.

In FIG. 1, the auxiliary waveguides 12 and 13 are shown abruptly changing direction as they diverge from the principal guide 10 and as they assume a parallel direction after separating sufficiently to accommodate branch guide 14. In practice, however, this would be done more gradually as indicated in FIG. 6 where guides 12 and 13 are shown following a smoothly varying course. To minimize reflections, the length $l$ of the diverging interval would be greater than half a wavelength of the highest frequency to be propagated therethrough and the angle $\alpha$ approximately 10 to 15 degrees. To minimize mode conversion effects, the length $l$ should be greater than one-half the beat wavelength $\lambda_b$, where $$\lambda_b = \frac{1}{\frac{1}{\lambda_{01}} - \frac{1}{\lambda_x}}$$

for which $\lambda_{01}$ is the guide wavelength of the highest frequency in the $TE^{\ominus}_{10}$ mode, and $\lambda_x$ is the guide wavelength of one of the possible spurious modes such as the $TE^{\ominus}_{11}$ or $TE^{\ominus}_{12}$ mode. Calculations are made to ascertain the largest possible beat wavelength.

Having determined a minimum permissible length based upon reflection considerations and a minimum permissible length based upon mode conversion considerations, a length $l$ is selected equal to or greater than the larger of these two calculated values.

FIG. 7 shows an alternate method of coupling between the auxiliary guides and the branch guides. Instead of having a distribution of coupling apertures such as 18 and 19, a pair of longitudinally spaced resonant cavities are used. As shown in FIG. 7, a pair of resonant cavities 70 and 71, tuned to the channel to be separated, are coupled to guides 12 and 13 by means of apertures 72, 73, 74 and 75. The cavity apertures are spaced from each other a distance equal to an odd number of quarter wavelengths of the frequency to be dropped. The dropped channel is coupled to the branch guide 76 by means of an aperture 77 in one of the cavities.

The operation of the channel-dropping network utilizing two cavities instead of the distributed couplers of FIG. 1 is substantially the same as that described above.

Because the $TE^{\circ}_{01}$ circular electric mode is not the dominant mode and because the transmission loss for the circular electric mode is inversely related to the guide diameter, the principal waveguide 10 and the auxiliary waveguides 12 and 13 are generally large enough to support other higher order spurious modes. In the power dividing region the transition from circular waveguide to semicircular waveguide was gradually accomplished over a prescribed distance in an effort to minimize the generation of such spurious modes in that portion of the network. It may also be necessary, particularly in the lump element coupling arrangement of FIG. 7, to provide additional spurious mode protection in the coupling region as well.

The two principal modes having longitudinal magnetic field components along the axis of a circular cylindrical waveguide in addition to the preferred $TE^{\circ}_{01}$ mode and, thus, capable of coupling to and from the rectangular guide cavities 70 and 71 of FIG. 7, are the $TE^{\circ}_{21}$ and the $TE^{\circ}_{31}$ modes. The electric field configuration for each of these modes is indicated in FIG. 8 and FIG. 9, respectively. The designations $TE^{\ominus}_{21}$ and $TE^{\ominus}_{31}$ are used to describe the semicircular field distribution for these modes as they would exist in the semicircular auxiliary guides, and refer to that portion of the field distributions which is either above or below the septum shown in each of the figures.

If coupling to either of these spurious modes becomes serious, radial conductive vanes are placed within the auxiliary guides on both sides of the coupling apertures. As shown in FIG. 7 the vanes are arranged in clusters with clusters 80, 81 and 82 in guide 12 and clusters 83, 84 and 85 in guide 13.

Assuming that the highest order spurious mode anticipated is the $TE^{\ominus}_{31}$ mode, each cluster would include at least three vanes, symmetrically disposed every 45 degrees. If higher order modes are anticipated because larger waveguides are used, then, correspondingly, additional vanes are added to each cluster. The clusters are located on both sides of the coupling apertures within each of the auxiliary guides, with the space between adjacent clusters equal to $(2n+1)\lambda/4$, where $n$ is an integer and $\lambda$ is the guide wavelength of wave energy at the cavity frequency. The thin radial vanes reflect the spurious modes, thus creating a cavity in the auxiliary guides for these modes. However, the cavities are caused to be out of resonance by virtue of the $(2n+1)\lambda/4$ spacing, thereby making a very poor impedance match for the spurious modes at the coupling apertures 72, 73, 74 and 75. As a result, the coupling to the spurious modes is greatly reduced without appreciably altering the coupling between the preferred $TE^{\ominus}_{01}$ mode and the cavities 70 and 71.

In the various illustrative embodiments of the invention described above, the principal waveguide has been characterized as a circular cylindrical waveguide supportive of the circular electric mode of wave propagation. It is to be understood, however, that the teachings of this invention may readily be applied to other waveguide configurations and other waveguide modes. This is illustrated in FIG. 10 in which a channel separating network, in accordance with the principles of the invention, is illustrated using rectangular waveguides throughout. In FIG. 10 the principal waveguide 100 is a hollow conductively bounded waveguide whose transverse cross-sectional dimensions are proportioned to support the $TE^{\square}_{10}$ mode of wave propagation over the operating frequency range of interest, $f_a \ldots f_n$. Waveguide 100 is divided into two equal auxiliary waveguides 102 and 103 of rectangular cross section by means of a conductive septum 101 longitudinally disposed in a direction parallel to the wide walls of guide 100. Guides 102 and 103 diverge from each other a distance sufficient to accommodate between them the rectangular branch guide 104. The latter extends symmetrically between the auxiliary guides with its upper wide wall contiguous to the lower wide wall of guide 102 and its lower wide wall contiguous to the upper wide wall of guide 103.

Waveguide 104 is electromagnetically coupled to the auxiliary guides by means of apertures 105 and 106 extending through the center of the contiguous broad walls. The right hand end of guide 104 is terminated in a reflectionless manner by the characteristic impedance of the guide.

To the right of the coupling intervals defined by the coupling apertures 105 and 106 are the series resonant filters 107 and 108 tuned to a frequency $f_b$ within the band $f_a \ldots f_n$.

It will be recalled from our discussion of FIG. 1 that only wave energy within a limited band of frequencies (one of the channels) is to be coupled to any one branch guide. Since this band of frequencies is determined by the filters, it is essential that all of the incident wave energy propagate past the apertures and that only that portion of wave energy that is reflected back to the coupling apertures by the filters be capable of coupling to any particular branch guide. Accordingly, the incident wave energy from the principal guide must arrive at the coupling apertures in an out-of-phase relationship with respect to the wave energy supported in the branch guide. This was inherent in the embodiment of FIG. 1. However, in the embodiment of FIG. 10 the incident wave energy arrives at the coupling apertures in an in-phase relationship. The effect would be, therefore, to couple incident wave energy directly to branch guide 104. To avoid this, a 180 degree phase delay 109, is introduced into one of the auxiliary guides (in this instance, guide 103). This establishes the desired out-of-phase relationship thereby allowing the incident wave energy to propagate past the coupling apertures. Upon reflection, however, the wave energy in the selected band of frequencies centered at $f_b$ reappears at the coupling apertures with an additional 180 degree phase reversal, thus reestablishing the desired inphase condition for that particular band of frequencies.

Auxiliary guides 102 and 103 may be recombined as in the embodiment of FIG. 1, or additional channels can be dropped by cascading branch guides and suitable filters in the manner described in connection with FIG. 5. In all other respects, the operation of the embodiment shown in FIG. 10 is as was described above.

The 180 degree phase delay can be obtained by inserting a section of dielectric material, such as, for example, polyfoam, in one of the branch guides or in any other manner well known in the microwave art. Alternatively, the 180 degree relative phase shift between the incident wave energy in the two auxiliary guides may be obtained by physically rotating the two auxiliary guides relative to each other.

In the various embodiments described above, the principal waveguide and the auxiliary waveguides constituted a simple, broadband power dividing network. The branch waveguides constituted merely a means for carrying away preselected components of wave energy. Together they were considered as part of a more complex network.

However, it should be noted that they have separate utility as a broadband hybrid junction wherein the principal waveguide and the branch waveguide comprises one pair of conjugate arms and wherein the auxiliary guides comprise a second pair of conjugate arms. However, since these four arms do not converge at a common junction, they are not plagued with the usual frequency limitations inherent in the prior art hybrid junctions.

In all cases it is understood that the above-described arrangements are illustrative of a small number of the many possible specific embodiments which can represent application of the principles of the invention. For example, the embodiment illustrated in FIG. 10 can be modified by coupling the branch waveguide to the auxiliary waveguides along their respective narrow walls and by effecting a 180 degree relative phase shift between the incident wave energy in the two auxiliary guides by rotating said guides relative to each other. Thus, numerous and varied other arrangements can readily be devised in accordance with these principles by those skilled in the art without departing from the spirit and scope of the invention.

What is claimed is:

1. In an electromagnetic wave transmission system supportive of wave energy over a broad frequency range, means for energizing said system with a plurality of discrete signals centered at frequencies within said frequency range, a signal separating network for separating said plurality of signals comprising a first section of guided wave path, a conductive septum for bifurcating said first wave path into two auxiliary wave paths each having equal cross-sectional dimensions and each being supportive of equal portions of said wave energy over said frequency range, a plurality of pairs of wave filters disposed in longitudinal succession along said auxiliary paths with one filter of each pair being located in one of said auxiliary paths and the other filter of each pair being located in the other of said auxiliary paths, each pair of filters having a common resonant frequency which differs from the common resonant frequency of each of the other of said pairs to reflect a portion of the wave energy in each of said auxiliary paths at one of said signal frequencies to the exclusion of the remaining signals, the filters comprising each pair of filters being longitudinally displaced relative to each other to introduce a 180 degree relative phase shift between said portions of reflected wave energy, and a plurality of branch wave paths equal in number to the number of pairs of filters coupled to both of said auxiliary paths to receive in each of said branches one of said signals to the exclusion of the remaining signals.

2. The combination according to claim 1 wherein said first section of wave path is a circular cylindrical waveguide supportive of the $TE^{\circ}_{01}$ mode of wave propagation and wherein said septum bifurcates said first waveguide into two auxiliary waveguides of semicircular cross section.

3. The combination according to claim 1 wherein said first section of wave path is a rectangular waveguide supportive of the $TE^{\square}_{10}$ mode of wave propagation and wherein said septum bifurcates said first waveguide into two auxiliary rectangular waveguides whose narrow dimensions are one-half the narrow dimension of said first waveguide.

4. A channel separating network comprising a section of hollow circular cylindrical waveguide supportive of electromagnetic wave energy over a range of frequencies in a $TE^{\circ}_{01}$ mode of wave propagation, said section dividing symmetrically at a junction into two separate auxiliary waveguides of semicircular cross section each supportive of equal portions of said wave energy in said range of frequencies, a resonant filter for rejecting a portion of said wave energy disposed in each of said auxiliary guides with the filter in one of said auxiliary guides longitudinally displaced from the filter in the other of said auxiliary guides by a distance equal to $(2n+1)\lambda/4$ where $n$ is an integer and $\lambda$ is the guide wavelength of wave energy at the resonant frequency of said filters, a section of rectangular waveguide and means for coupling said rectangular waveguide to both of said auxiliary guides in a region between said junction and said filters.

5. The combination according to claim 4 wherein said rectangular waveguide is symmetrically located between said auxiliary guides with the narrow walls of said rectangular guide contiguous and parallel to the planar walls of said auxiliary guides and wherein said coupling means comprises a plurality of apertures extending through said contiguous walls.

6. A channel separating network comprising a section of hollow circular cylindrical waveguide supportive of electromagnetic wave energy over a range of frequencies in the $TE^{\circ}_{01}$ mode of wave propagation, said section dividing symmetrically at a junction into two separate auxiliary waveguides of semicircular cross section each supportive of equal portions of said wave energy over said range of frequencies, a resonant filter for rejecting a portion of said energy disposed in each of said auxiliary guides with the filter in one of said auxiliary guides longitudinally displaced from the filter in the other of said guides by a distance equal to $(2n+1)\lambda/4$ wherein $n$ is an integer and $\lambda$ is the guide wavelength of wave energy at the resonant frequency of said filters, a branch waveguide for receiving said portion of said wave energy and means for coupling said potrion of said wave energy from said auxiliary guides to said branch guide comprising a pair of resonant cavities coupled to both of said auxiliary guides in a region between said junction and said filters with one of said cavities being coupled to said branch guide.

7. A channel separating network comprising a section of rectangular waveguide supportive of electromagnetic wave energy over a range of frequencies in the $TE^{\square}_{10}$ mode of wave propagation, said section divding symmetrically at a junction into two auxiliary rectangular waveguides whose narrow dimensions are one-half the narrow dimension of said section of waveguide, each of said auxiliary waveguides being supportive of equal portions of said wave energy in said range of frequencies, a resonant filter for rejecting a portion of said wave energy disposed in each of said auxiliary guides with the filter in one of said auxiliary guides longitudinally displaced from the filter in the other of said auxiliary guides by a distance equal to $(2n+1)\lambda/4$ where $n$ is an integer and $\lambda$ is the guide wavelength of wave energy at the resonant frequency of said filters, means for introducing a 180 degree phase delay disposed in one of said auxiliary waveguides between said junction and said filters, a fourth section of rectangular waveguide and means for coupling said fourth guide to both of said auxiliary guides in a region between said filters and said delay means.

8. The combination according to claim 7 wherein said fourth waveguide is symmetrically located between said auxiliary guides with the wide walls of said fourth guide contiguous and parallel to the wide walls of said auxiliary guides and wherein said coupling means comprises a plurality of apertures extending through said contiguous walls.

9. A hybrid junction comprising a section of circular waveguide supportive of electromagnetic wave energy in the $TE^{\circ}_{01}$ mode of wave propagation, means for dividing said circular waveguide into two auxiliary waveguides of semicircular cross section each having a semicircular conductive wall and a planar conductive wall, a length of rectangular waveguide having a pair of narrow and a pair of wide conductive walls located between said auxiliary guides with one of said narrow walls parallel and contigous to the planar wall of one of said auxiliary guides, the other of said narrow walls contiguous and parallel to the planar wall of the other of said auxiliary guides, means for providing directional coupling properties between said auxiliary guides and said rectangular waveguide located in each of said pairs of contiguous walls, and means for terminating one end of said rectangular waveguide in a reflectionless manner.

10. The combination according to claim 9 wherein said narrow walls are symmetrically located with respect to the transverse dimension of said planar walls, and wherein said directional coupling means comprises a plurality of apertures extending through and longitudinally distributed along.

11. A hybrid junction comprising a section of rectangular waveguide supportive of electromagnetic wave energy in the $TE^{\square}_{10}$ mode of wave propagation, means for dividing said rectangular waveguide into two auxiliary rectangular waveguides whose narrow dimensions are one-half the narrow dimension of said section of waveguide, a fourth section of rectangular waveguide directional coupling means for coupling said fourth section of waveguide to both of said auxiliary guides, means for terminating one end of said fourth section in a reflectionless manner, and means for introducing a 180 degree phase delay disposed in one of said auxiliary waveguides between said dividing means and said coupling means.

12. The combination according to claim 11 wherein said fourth waveguide is located between said auxiliary guides with each of its wide walls contiguous and parallel to a wide wall of each of said auxiliary guides and wherein said coupling means comprises a plurality of apertures extending through said contiguous walls.

13. A frequency separating network comprising first and second sections of circular waveguide supportive of electromagnetic wave energy over a range of frequencies in the $TE^{\circ}_{01}$ mode of wave propagation, each of said sections dividing symmetrically at a junction into two separate auxiliary waveguides of semicircular cross section, the auxiliary waveguides of said first section being connected to the auxiliary waveguides of said second section respectively forming two transmission paths having substantially equal overall phase shifts between said junctions, a third section of waveguide, means for electromagnetically coupling said third guide to both of said transmission paths, and wave filtering means resonant at a given frequency within said range disposed between said coupling means and said second section of circular waveguide in both of said paths, the filter in one of said paths being one-quarter wavelength nearer one of said junctions than the filter in the other of said paths.

14. In an electromagnetic wave transmission system a section of circular cylindrical waveguide supportive of the $TE^{\circ}_{01}$ mode of wave propagation, a cavity resonator having an opening into said guide and means for suppressing noncircular spurious wave modes disposed along said guide on both sides of said opening comprising a plurality of thin conductive radial vanes arranged in clusters, the longitudinal distance between adjacent clusters being approximately equal to an odd integral multiple of a quarter wavelength at the mid-band frequency of said resonator.

15. In an electromagnetic wave transmission system a section of semicircular waveguide supportive of the $TE^{\frown}_{01}$ mode of wave propagation, said waveguide having a semicircular and a planar wall surface, a cavity reonator having an opening into said guide along the center of said planar wall surface and means for suppressing spurious wave modes disposed along said guide on both sides of said opening comprising a plurality of thin conductive radial vanes arranged in clusters, the longitudinal distance between adjacent clusters being approximately equal to an odd integral multiple of a quarter wavelength at the mid-band frequency of said resonator.

16. A channel separating network comprising a section of hollow circular waveguide supportive of electromagnetic wave energy over a range of frequencies in a $TE_{01}$ mode of wave propagation, said section dividing symmetrically at a junction into two separate auxiliary waveguides of semicircular cross section each supportive of equal portions of said wave energy in said range of frequencies, a resonant filter for rejecting a portion of said wave energy disposed in each of said auxiliary guides with a filter in one of said auxiliary guides longitudinally displaced from the filter in the other of said auxiliary guides by a distance equal to an odd multiple of quarter wavelengths at the resonant frequency of said filters, a section of rectangular waveguide, means for providing directional coupling properties between said rectangular waveguide and each of said auxiliary guides in a region between said junction and said filters where the electrical distances between said junction and said coupling means in the two auxiliary guides are equal, and means for terminating one end of said rectangular guide in its characteristic impedance.

17. A channel separating network comprising a section of rectangular waveguide supportive of electromagnetic wave energy over a range of frequencies in the $TE_{10}$ mode of wave propagation, said section dividing symmetrically at a junction into two auxiliary rectangular waveguides whose narrow dimensions are one-half the narrow dimension of said section of waveguide, each of said auxiliary waveguides being supportive of equal portions of said wave energy in said range of frequencies, a resonant filter for rejecting a portion of said wave energy disposed in each of said auxiliary guides with the filter in one of said auxiliary guides displaced from the filter in the other of said auxiliary guides by a distance equal to an odd multiple of quarter wavelengths at the resonant frequency of said filters, a fourth section of rectangular waveguide, means for providing directional coupling properties between said fourth guide and each of said auxiliary guides in a region between said junction and said filters where the electrical distances between said junction and said coupling means in the two auxiliary guides differ by one-half wavelength, and means for terminating one end of said fourth section of rectangular waveguide in its characteristic impedance.

References Cited in the file of this patent

UNITED STATES PATENTS

| | | |
|---|---|---|
| 2,531,419 | Fox | Nov. 28, 1950 |
| 2,853,683 | Murphy | Sept. 23, 1958 |
| 3,010,088 | Kahn | Nov. 21, 1961 |

FOREIGN PATENTS

| | | |
|---|---|---|
| 1,031,982 | France | Feb. 2, 1951 |